US010690942B2

(12) United States Patent
Hofer-Kraner et al.

(10) Patent No.: US 10,690,942 B2
(45) Date of Patent: Jun. 23, 2020

(54) SUNGLASSES WITH A SUN PROTECTION FILTER

(71) Applicant: Optrel Holding AG, Appenzell (CH)

(72) Inventors: Ramon Hofer-Kraner, Herisau (CH); Martin Esposito, Rapperswil (CH); Daniel Bloechlinger, Gallenkappel (CH)

(73) Assignee: Optrel Holding AG, Appenzell (CH)

( * ) Notice: Subject to any disclaimer, the term of this patent is extended or adjusted under 35 U.S.C. 154(b) by 165 days.

(21) Appl. No.: 15/621,134

(22) Filed: Jun. 13, 2017

(65) Prior Publication Data

US 2017/0357108 A1    Dec. 14, 2017

(30) Foreign Application Priority Data

Jun. 14, 2016   (EP) .................................... 16174458

(51) Int. Cl.

| | |
|---|---|
| G02C 7/10 | (2006.01) |
| G02C 11/00 | (2006.01) |
| B29D 12/02 | (2006.01) |
| G02F 1/133 | (2006.01) |
| B29C 45/14 | (2006.01) |

(52) U.S. Cl.
CPC ............. *G02C 7/101* (2013.01); *B29D 12/02* (2013.01); *G02C 11/10* (2013.01); *G02F 1/13318* (2013.01); *B29C 45/14639* (2013.01); *G02F 2001/13312* (2013.01); *G02F 2001/13324* (2013.01)

(58) Field of Classification Search
CPC ........... G02C 7/101; G02C 7/10–7/108; G02C 11/10; B29D 12/02

USPC ................. 349/13–14; 351/159.57, 158
See application file for complete search history.

(56) References Cited

U.S. PATENT DOCUMENTS

| 4,920,257 A * | 4/1990 | Fuerthbauer | ............ A61F 9/067 349/14 |
| 5,382,986 A * | 1/1995 | Black | ...................... G01J 1/429 351/158 |
| 5,510,609 A * | 4/1996 | Ackermann | ........... G02C 7/101 359/275 |
| 7,630,128 B2 * | 12/2009 | Krieg-Kowald | ........ A61F 9/022 359/350 |

(Continued)

FOREIGN PATENT DOCUMENTS

| DE | 197 14 434 A1 | 10/1998 |
| EP | 2 565 603 A2 | 3/2013 |

OTHER PUBLICATIONS

"Shortpass Filter, 12.5 mm, 400 nm Cut-off, 325-385 nm Transmission." 05SWF-400-B, Nov. 5, 2013, www.newport.com/p/05SWF-400-B.*

(Continued)

Primary Examiner — Zachary W Wilkes
(74) Attorney, Agent, or Firm — Posz Law Group, PLC

(57) ABSTRACT

The invention is based on a sun protection device, in particular sunglasses, with at least one optical sun protection filter comprising at least one liquid-crystal cell, and with at least one sensor unit, which is configured for capturing a solar irradiation. It is proposed that at least one sensor cover, which covers a sensor surface of the at least one sensor unit at least partly and which is, at least partly, at least substantially opaque with respect to an irradiation of a visible light spectrum.

9 Claims, 5 Drawing Sheets

(56) References Cited

U.S. PATENT DOCUMENTS

Figure 1:
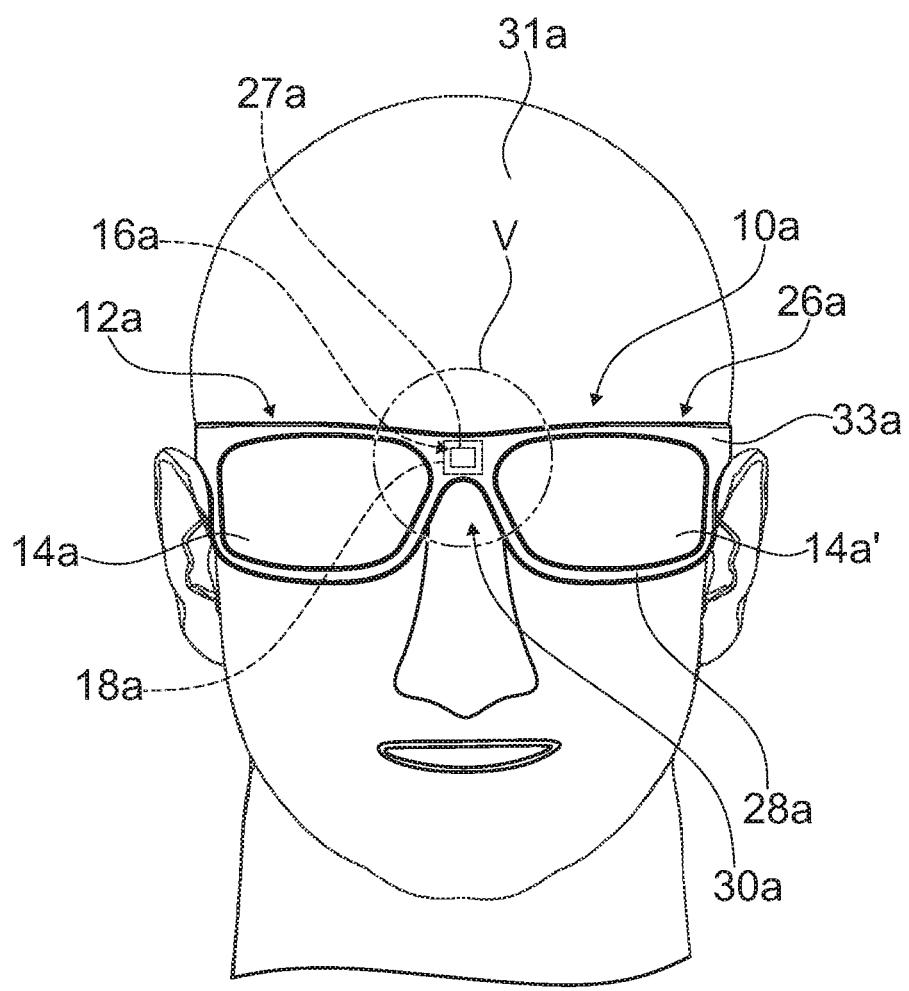

| | | |
|---|---|---|
| 8,081,262 B1 | 12/2011 | Perez |
| 9,846,473 B1 * | 12/2017 | Kalscheur ............. G06F 1/3231 |
| 2008/0186565 A1 * | 8/2008 | Krieg-Kowald ........ A61F 9/022 |
| | | 359/356 |

OTHER PUBLICATIONS

Longpass Filter, Dielectric, 25.4 Mm, 750 ± 6 Nm Cut-On, 765-1200 Nm. 10LWF-750-B, May 16, 2011, www.newport.com/p/10LWF-750-B.*

Extended European Search Report dated Dec. 2, 2016 issued in corresponding EP patent application No. 16174458.6 (and partial English translation).

* cited by examiner

've
SUNGLASSES WITH A SUN PROTECTION FILTER

CROSS REFERENCE TO RELATED APPLICATION

This application is based on and incorporates herein by reference European Patent Application No. 16174458.6 filed an Jun. 14, 2016.

STATE OF THE ART

The invention relates to a sun protection device.

From U.S. Pat. No. 8,081,262 B1 a sun protection device, in particular sunglasses, has already been proposed, with at least one optical sun protection filter comprising at least one liquid-crystal cell, and with at least one sensor unit, which is configured for capturing a solar irradiation.

The objective of the invention is in particular to provide a generic device having improved characteristics regarding robustness as well as regarding adaptability. The objective is achieved, according to the invention, by the features of patent claim 1 while advantageous implementations and further developments of the invention may be gathered from the subclaims.

ADVANTAGES OF THE INVENTION

The invention is based on a sun protection device, in particular sunglasses, with at least one optical sun protection filter comprising at least one liquid-crystal cell, and with at least one sensor unit, which is configured for capturing a solar irradiation.

It is proposed that the sun protection device comprises at least one sensor cover, which covers a sensor surface of the at least one sensor unit at least partly and which is, at least partly, at least substantially opaque with respect to a radiation of a visible light spectrum. Preferably the sun protection device further comprises a control and/or regulation unit, which is configured to control and/or regulate a permeability of the optical sun protection filter depending on a solar irradiation. By a "sun protection device" is in particular, in this context, a device to be understood which is configured for a protection of a user's eyes from solar irradiation, in particular bothersome solar irradiation. It is preferentially to be understood as a device configured to at least reduce a solar irradiation. Particularly preferably the sun protection device is in at least one operating state configured for darkening a solar irradiation, in particular bothersome solar irradiation, on the user's eyes. A variety of implementations of the sun protection device are conceivable which are deemed expedient by someone skilled in the art, e.g. as a protective sun visor and/or particularly preferably as sunglasses. Furthermore, an "optical sun protection filter" is in particular, in this context, to be understood as an optical filter which in particular implements a protective glass and/or a protective synthetic glass, in particular for protection from bothersome solar irradiation. It is preferentially to be understood, in particular, as a protective optical filter the light permeability of which is realized in such a way that it is adjustable. It is preferably to be understood, in particular, as a protective optical filter with an automatic darkening. Especially preferentially the sun protection filter comprises at least one liquid-crystal plane which is switchable in the transmittance. The optical sun protection filter preferably comprises at least one liquid-crystal cell. A variety of liquid-crystal cells are conceivable which are deemed expedient by someone skilled in the art, like in particular a TN liquid-crystal cell featuring the Twisted Nematic technology. By a "sensor unit" is in particular, in this context, a unit to be understood which is configured to receive at least one parameter and/or physical property, wherein the reception may be effected in an active manner, like in particular via generating and outputting an electric measuring signal, and/or in a passive manner, like in particular via capturing property changes of a sensor component. A variety of sensor units for a sun protection device are conceivable which may be deemed expedient by someone skilled in the art. The sensor unit preferably comprises at least one photocell, in particular a photodiode and/or in particular a solar cell. Preferably the photocell in particular configured at least for an optical detection of a sunlight and/or of an artificial light.

By a "sensor cover" is in particular, in this context, an element to be understood which covers, in particular overlays, the at least one sensor unit at least partly, preferably in a detection direction of the sensor unit. It is preferentially in particular to be understood as an element covering, in particular overlaying, a sensor surface of the at least one sensor unit at least partly. It is preferably in particular to be understood as a cover which at least partly covers the at least one sensor unit, preferably in a detection direction of the sensor unit, in particular for the purpose of protection, e.g. from shocks or the like. Especially preferentially it is in particular to be understood as a cover which at least partly covers the at least one sensor unit, in particular in a detection direction of the sensor unit, in particular for the purpose of integrating the sensor unit in such a way that it is invisible to a beholder from the outside. Furthermore, a "sensor surface" of the sensor unit is in particular, in this context, to be understood as a detection surface of the sensor unit. It is preferably in particular to be understood as a surface of the sensor unit on which the sensor unit is capable of capturing a solar irradiation. It is especially preferentially to be understood as a cell surface of the sensor unit. Preferably the sensor surface is oriented forward, i.e. in particular in a direction of a user's hypothetical viewing direction. Preferentially the sensor surface extends substantially in parallel to a front side of the sun protection device. By "the sensor cover covering the sensor surface of the at least one sensor unit at least partly" is in particular, in this context, to be understood that at least 10%, preferably at least 30% and especially preferentially at least 50% of all surface normals of the sensor surface intersect with the sensor cover in a direction facing away from the sensor unit. "At least partly with respect to a radiation of a visible light spectrum" is in particular to mean with respect to a radiation of at least one wavelength of the visible light spectrum. It is preferentially in particular to mean with respect to a radiation of at least 10%, preferably at least 40% and particularly preferably at least 70% of a spectral range of the visible light spectrum. Herein a "visible light spectrum" is in particular to mean a radiation with a wavelength λ of 380 nm to 780 nm. "At least substantially opaque" is in particular to mean, in this context, that at least 50%, preferably at least 70% and particularly preferably at least 90% of a respective radiation are absorbed and/or reflected. The at least one "sensor cover being, at least partly, at least substantially opaque with respect to a radiation of a visible light spectrum" is in particular to mean that a radiation with at least one wavelength of the visible light spectrum, in particular a radiation of at least 10%, preferably at least 40% and particularly preferably at least 70% of a spectral range of the visible light spectrum, is at least substantially absorbed and/or reflected by the sensor cover. It is preferentially to mean, in particular, that the sensor cover is at least substantially invisible, in particular opaque, to the human eye. "Configured" is in particular to mean specifically programmed, designed and/or equipped. By an object being configured for a certain function is in particular to be understood that the object fulfills and/or implements said certain function in at least one application state and/or operating state.

Moreover, a "control and/or regulation unit" is in particular, in this context, to be understood as a unit featuring at least one controlling electronics component. A "control electronics component" is in particular to mean a unit with at least one electronical circuit which is preferably composed of voltage components and reference control components. Principally, however, the control electronics component may also have a more complex structure, e.g. in particular using an application-specific integrated circuit (ASIC) and/or a micro-controller component. A "permeability of the optical sun protection filter" is in particular to mean, in this context, a transmittance intensity of sunlight through the optical sun protection filter. It is preferably in particular to mean the degree by which the visible spectrum of the sunlight is absorbed and/or reflected by the optical sun protection filter. Particularly preferably it is in particular to mean a shade.

By the implementation of the sun protection device according to the invention, in particular an advantageously robust sun protection device may be rendered available. It is in this way advantageously possible to protect the sensor unit of the sun protection device. This also advantageously allows hiding the sensor unit. In particular, a bothersome arrangement of the sensor unit is avoidable. In particular, a high degree of adaptability of the sun protection device is achievable. Moreover this in particular allows using an advantageously large sensor unit without affecting a visible image of the sun protection device.

It is also proposed that the at least one sensor cover covers the sensor surface of the at least one sensor unit at least substantially entirely. Preferably the at least one sensor cover covers the sensor surface of the at least one sensor unit in particular entirely. By "the sensor cover covering the sensor surface of the at least one sensor unit at least substantially entirely" is in particular to be understood, in this context, that at least 70%, preferably at least 80% and especially preferentially at least 90% of all surface normals of the sensor surface intersect with the sensor cover in a direction facing away from the sensor unit. This allows in particular providing an advantageously robust sun protection device. In this way the sensor unit may be protected especially advantageously. Moreover, this allows hiding the sensor unit advantageously completely. In particular, a bothersome arrangement of the sensor unit is avoidable.

It is further proposed that the at least one sensor cover is, at least partly, at least substantially translucent with respect to a radiation of an infrared-light spectrum. "At least partly with respect to a radiation of an infrared-light spectrum" is in particular to mean, in this context, with respect to a radiation of at least one wavelength of the infrared-light spectrum, in particular of the near-infrared-light spectrum. It is preferably to mean, in particular, with respect to a radiation of at least 10%, preferably at least 40% and especially preferentially at least 70% of a spectral range of the infrared-light spectrum, in particular of the near-infrared-light spectrum. Herein an "infrared-light spectrum" is in particular to mean a radiation with a wavelength λ of at least 780 nm to at least 1100 nm, preferably up to at least 3000 nm. By "at least substantially translucent" is in particular to be understood, in this context, that at least 50%, preferably at least 70% and especially preferentially at least 90% of a respective radiation are transmitted. By the at least one "sensor cover being, at least partly, at least substantially translucent with respect to a radiation of an infrared-light spectrum" is in particular to be understood that a radiation with at least one wavelength of the infrared-light spectrum, in particular a radiation of at least 10%, preferably at least 40% and especially preferentially at least 70% of a spectral range of the infrared-light spectrum is at least substantially transmitted by the sensor cover. It is preferably in particular to mean that, while the sensor cover is at least substantially non-transparent, in particular opaque, for the human eye, still at least a portion of a radiation of an infrared-light spectrum permeates the sensor cover. This advantageously allows ensuring that at least a portion of a solar radiation hits on the sensor unit. It is in particular achievable that at least a portion of an energy of the solar radiation hits on the sensor unit. Still in spite of this, a visible arrangement of the sensor unit may be dispensed with.

Beyond this, it is proposed that the at least one sensor cover is, at least partly, at least substantially translucent with respect to a radiation of a UV light spectrum. "At least partly with respect to a radiation of a UV light spectrum" is in particular to mean, in this context, with respect to a radiation of at least one wavelength of the UV light spectrum, in particular of the UV-A light spectrum. It is preferably to mean, in particular, with respect to a radiation of at least 10%, preferentially at least 40% and especially preferentially at least 70% of a spectral range of the UV light spectrum, in particular of the UV-A light spectrum. Herein, a "UV light spectrum" is in particular to mean a radiation with a wavelength λ of at least 310 nm, in particular at least 100 nm to at least 380 nm, preferably up to at least 400 nm. By "at least substantially translucent" is in particular to be understood, in this context, that at least 50%, preferably at least 70% and particularly preferably at least 90% of a respective radiation are transmitted. By the at least one "sensor cover being, at least partly, at least substantially translucent with respect to a radiation of a UV light spectrum" is in particular to be understood that a radiation with at least one wavelength of the UV light spectrum, in particular a radiation of at least 10%, preferably at least 40% and particularly preferably at least 70% of a spectral range of the UV light spectrum is at least substantially transmitted by the sensor cover. It is preferentially to mean in particular that, while the sensor cover is at least substantially non-transparent, in particular opaque, for the human eye, still at least a portion of a radiation of a UV light spectrum permeates the sensor cover. This advantageously allows ensuring that at least a portion of a solar radiation hits on the sensor unit. It is in particular achievable that at least a portion of an energy of the solar radiation hits on the sensor unit. Notwithstanding all this, a visible arrangement of the sensor unit may be dispensed with.

It is also proposed that the sun protection device comprises a spectacle frame which is configured for accommodating the optical sun protection filter. Preferably the spectacle frame comprises at least one accommodating region, preferably at least two accommodating regions, which are respectively configured to receive a liquid-crystal cell of the at least one optical sun protection filter. By a "spectacle frame" is in particular, in this context, a frame to be understood which is configured for arranging the sun protection device in a user's face. Preferably the frame is configured for arranging the sun protection device on the user's nose as well as on the user's ears. Especially preferentially the spectacle frame is embodied by a spectacle framing. This in particular allows an advantageous implementation of the sun protection device. Preferably this allows arranging the sun protection device in a user's face in a reliable fashion. In particular, it is possible to provide a spectacle-like implementation of the sun protection device.

It is furthermore proposed that the at least one sensor cover is embodied at least partly in a one-part implementation with the spectacle frame. Preferably the at least one sensor cover is embodied in a one-part implementation with a base frame of the spectacle frame. Preferentially the spectacle frame comprises a base frame as well as two earpieces, which are movably supported on the base frame. Especially preferably the sensor cover and at least a portion of the spectacle frame, e.g. in particular the base frame, are made of the same material. "Embodied in a one-part implementation" is in particular to mean connected at least by substance-to-substance bond, e.g. by a welding process, an adhesive-bonding process, an injection-molding process and/or any other process that is deemed expedient by someone skilled in the art, and/or advantageously formed in one piece, e.g. by a production from one cast and/or by a production in a one-component or multi-component injection-molding process, and advantageously from a single blank, e.g. by turning, milling, laser-cutting and/or by any other method that is deemed expedient by someone skilled in the art. In this way an advantageous integration of the sensor cover is achievable. Beyond this, a number of structural components may thus be kept low. Moreover this allows in particular achieving an advantageously high level of homogeneity of the spectacle frame and of the entire sun protection device.

It is also proposed that the at least one sensor cover and the at least one spectacle frame are produced at least partly in an injection-molding procedure. Preferably the at least one sensor cover and the at least one spectacle frame are produced at least partly together in a one-part implementation in an injection-molding procedure. Preferably the sensor cover and the at least one spectacle frame are produced at least partly in a multi-component injection-molding procedure or especially preferentially in a one-component injection-molding procedure. This allows achieving a particularly advantageous integration of the sensor cover. Furthermore, in this way an advantageously simple production of the sun protection device is achievable.

Moreover it is proposed that the at least one sensor unit is at least partly integrated in the spectacle frame. Preferably the at least one sensor unit is at least partly accommodated in the spectacle frame. By "at least partly integrated" is in particular to be understood, in this context, that at least portions of the sensor unit, preferably the entire sensor unit, are arranged at least partly, in particular entirely, inside an outer contour of the spectacle frame. The sensor unit is herein preferably at least partly encompassed by the spectacle frame. Herein "at least partly encompassed" is in particular to mean that an encompassed element and/or an encompassed unit is enclosed by the spectacle frame in at least one plane, starting from a geometric center, over an angle range of at least 90 degrees, preferably at least 120 degrees and particularly preferably at least 180 degrees. In this way an advantageous integration of the sensor unit is achievable. This allows in particular achieving an advantageously high level of homogeneity of the spectacle frame and of the entire sun protection device. Beyond this, the sensor unit may be further protected in this way.

It is further proposed that the at least one sensor unit is in at least one operating state configured to at least partly supply an energy for actuating the at least one liquid-crystal cell of the optical sun protection filter. Preferentially the at least one sensor unit is in at least one operating state configured to completely supply an energy for actuating the at least one liquid-crystal cell of the optical sun protection filter. Preferably the at least one sensor unit is configured to completely supply an energy for actuating the at least one liquid-crystal cell of the optical sun protection filter during operation of the sun protection device. Especially preferentially the at least one sensor unit is configured to completely obtain, during operation of the sun protection device, an energy required for actuating the at least one liquid-crystal cell of the optical sun protection filter. The sun protection device is preferably embodied battery-free. This allows in particular dispensing with an external energy supply, e.g. via a battery and/or via an accumulator. A self-subsistent sun protection device may be rendered available.

Furthermore it is proposed that the at least one sensor unit comprises at least one photodiode and/or at least one solar cell. Preferably the sensor unit comprises at least one photocell. Preferentially the sensor unit is implemented by a solar cell and/or photocell. This allows making an advantageously reliable sensor unit with an advantageously high energy yield available. Beyond this, in particular an external energy supply, e.g. via a battery and/or via an accumulator, may be dispensed with. When using a photocell, in particular a sensor unit may be rendered available by which it is in particular possible to capture and preferably utilize light in a non-visible range, like in particular infrared light. When using a solar cell, it would be in particular preferable to use a solar cell which is in particular also capable of capturing and preferably utilizing light in a non-visible range, like in particular infrared light. In this way a self-subsistent sun protection device may be provided. In this way it is in particular achievable that with increasing solar irradiation a higher amount of energy is available for actuating the at least one liquid-crystal cell of the optical sun protection filter. An energy production is thus advantageously adapted to an energy requirement. It is moreover possible to capture a sufficient amount of radiation on the sensor unit even if the sensor unit is screened off with respect to visible light.

The invention is further based on a method for producing the sun protection device. It is proposed that at least a portion of the spectacle frame and the at least one sensor cover are produced in a one-part implementation in an injection-molding procedure. This allows making an advantageously simple and fast production of the sun protection device available. In particular, an advantageously small number of production steps may be provided.

Herein the sun protection device according to the invention, the sensor cover as well as the method are not to be restricted to the application and implementation form described above. In particular, the sun protection device according to the invention, the sensor cover as well as the method may, for fulfilling a functionality herein described, comprise a number of respective elements, structural components and units that differs from a number herein mentioned.

DRAWINGS

Further advantages will become apparent from the following description of the drawings. The drawings show two exemplary embodiments of the invention. The drawings, the description and the claims contain a plurality of features in combination. Someone having ordinary skill in the art will purposefully also consider the features separately and will find further expedient combinations.

Figure 2:
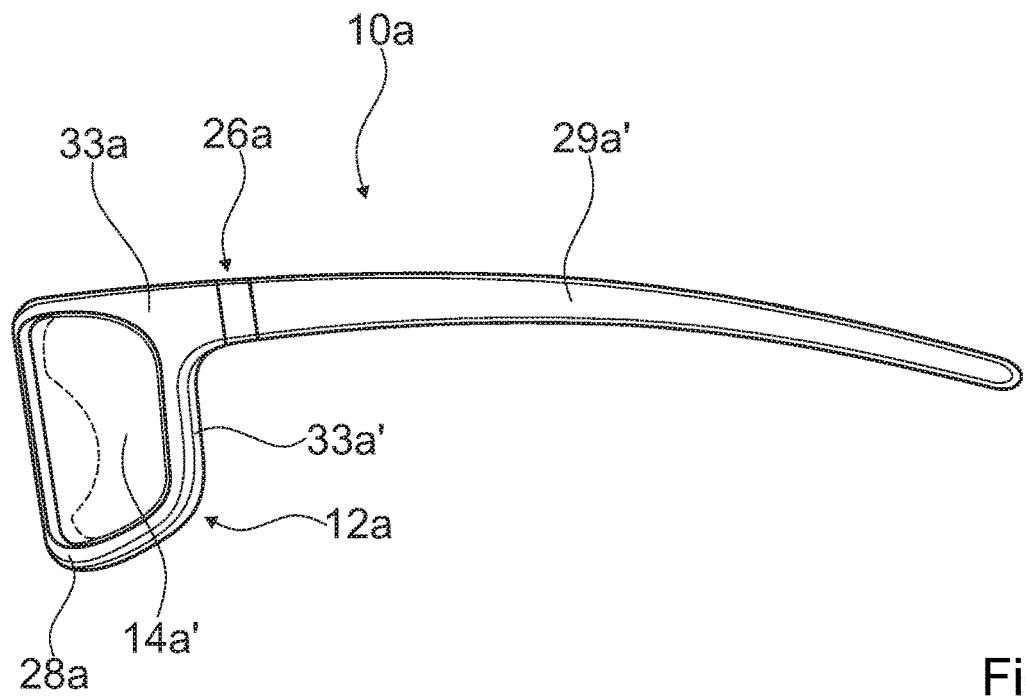
Figure 3:
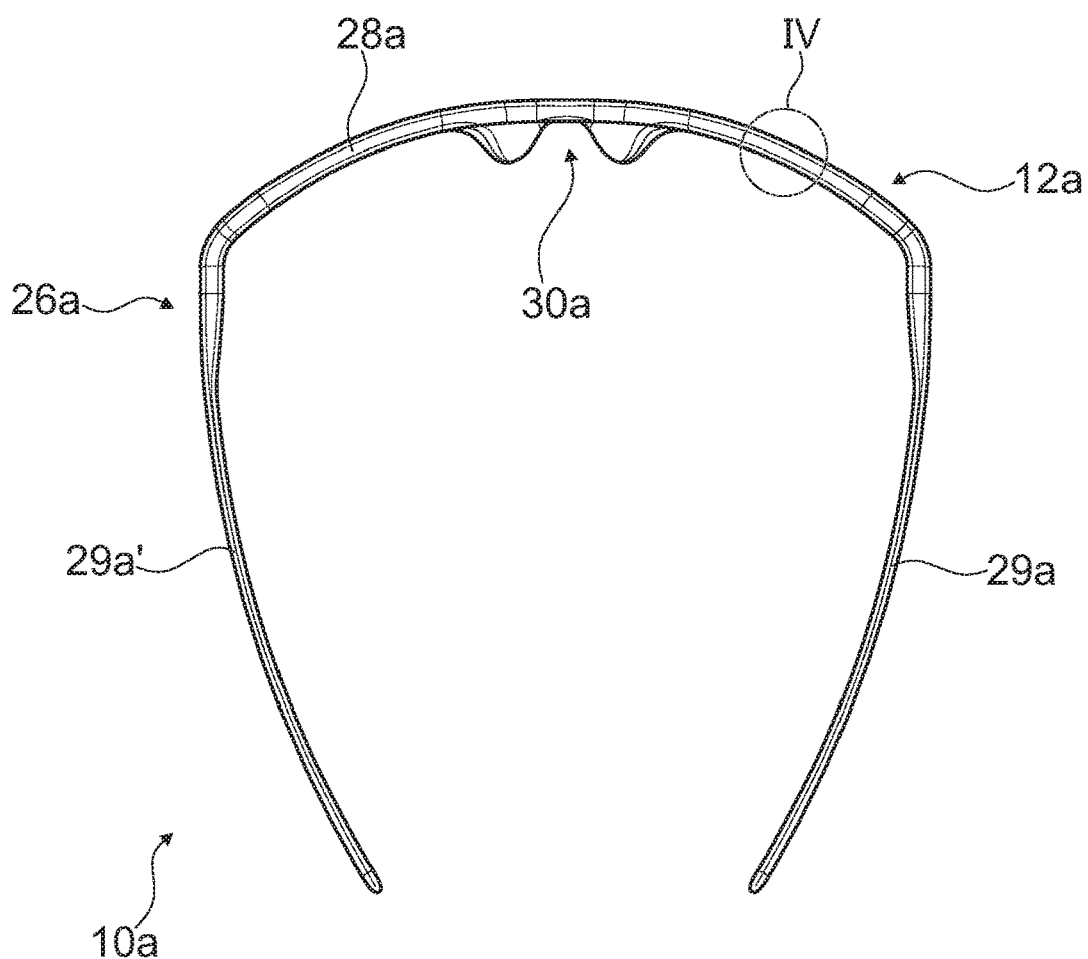
Figure 4:
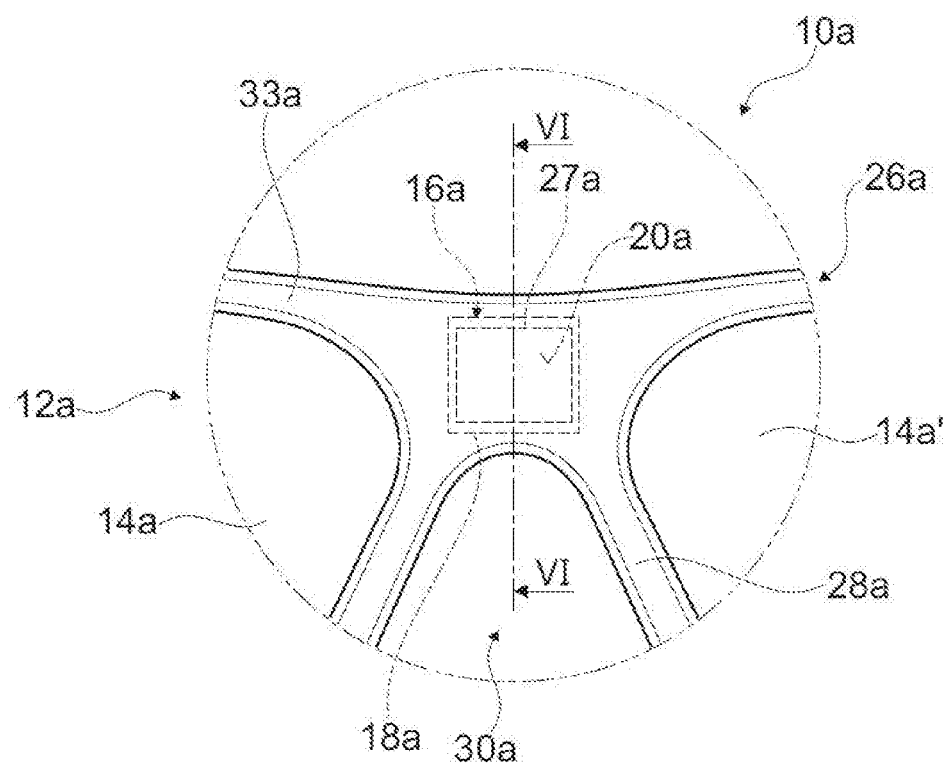
Figure 5:
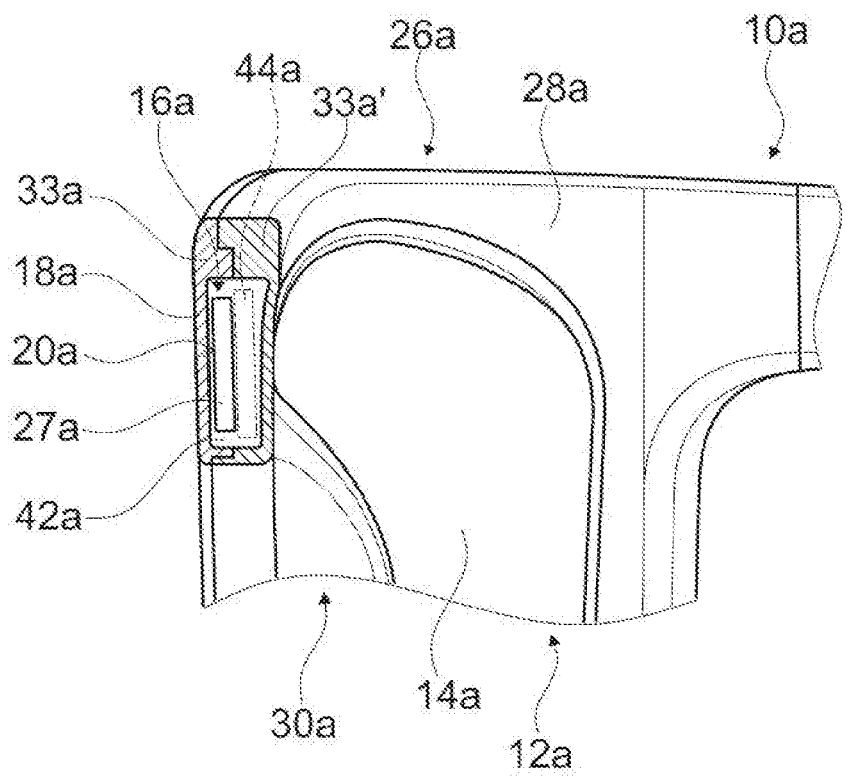
Figure 6:
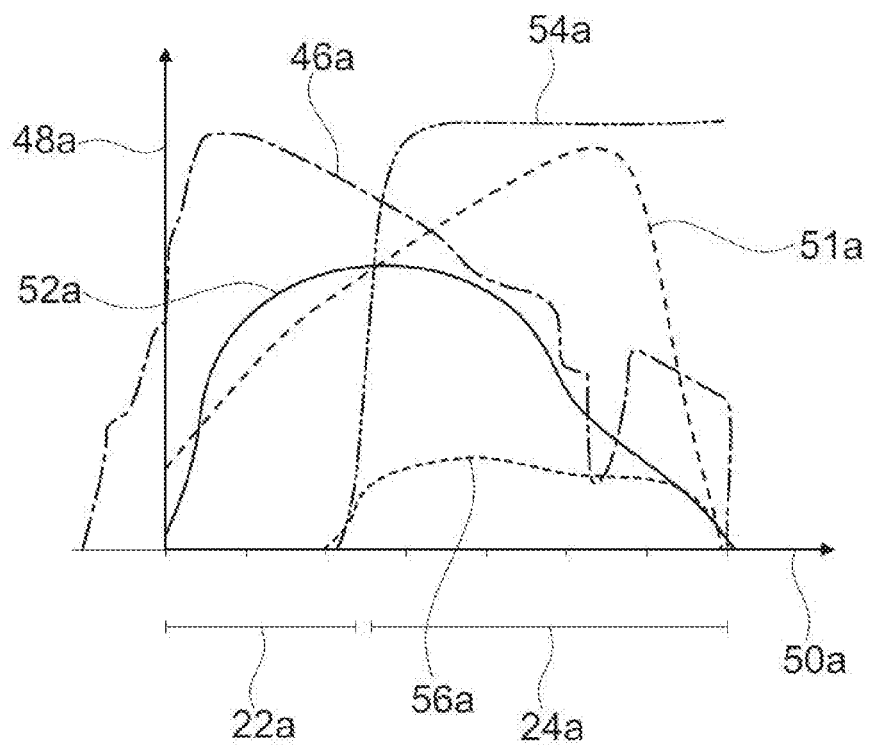
Figure 7:
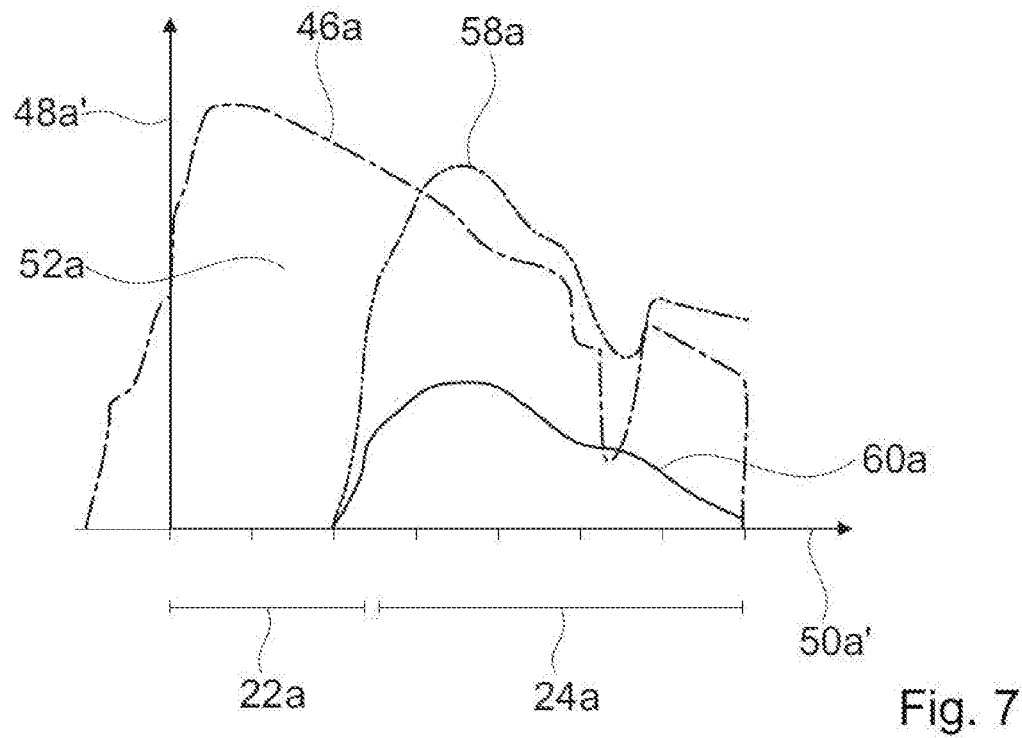
Figure 8:
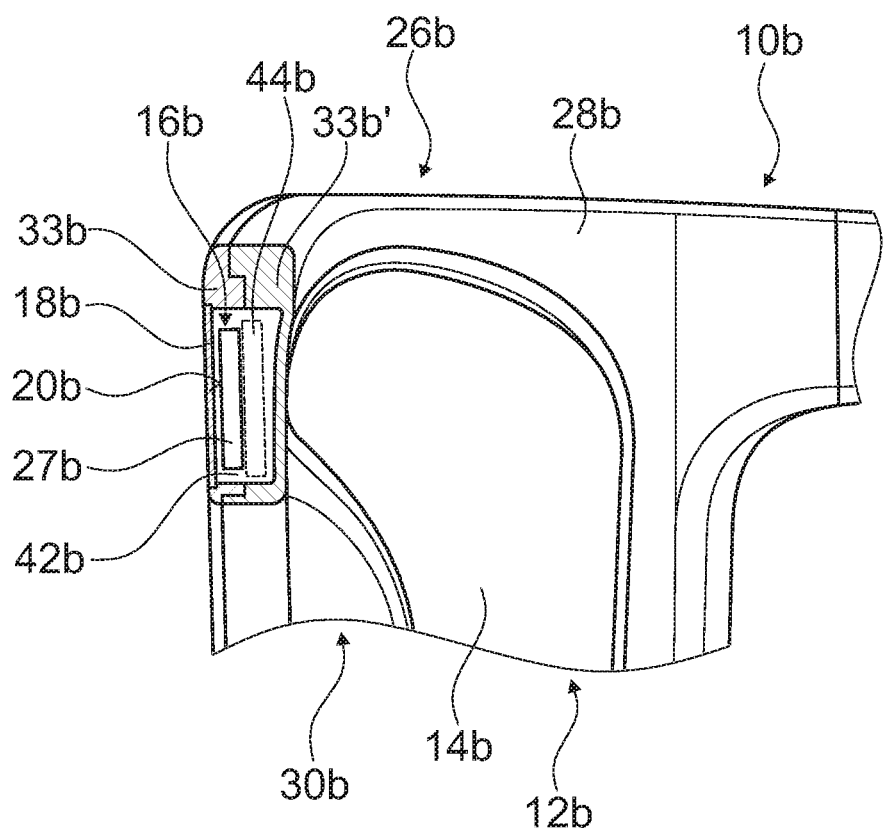

It is shown in:

FIG. 1 a sun protection device according to the invention, with a sun protection filter comprising two liquid-crystal cells, with a sensor unit and with a sensor cover, as well as a user wearing the sun protection device according to the invention, in a schematic front view, FIG. 2 the sun protection device according to the invention, in a schematic lateral view, FIG. 3 the sun protection device according to the invention, in a schematic view from above, FIG. 4 a partial section V of the sun protection device according to the invention with the sensor unit and with the sensor cover, in a schematic presentation, FIG. 5 a partial section of the sun protection device according to the invention with the sensor unit, with the sensor cover and with a control and regulation unit, in a schematic sectional view along the section line V-V, FIG. 6 a diagram of a sensitivity of the sensor unit, of a transparency of the sensor cover and of an intensity of the sunlight spectrum, of the intensity of the sunlight spectrum minus losses due to the sensor cover and of the sensitivity of the sensor unit resulting therefrom, depending on a wavelength, FIG. 7 a diagram of an intensity of the sunlight spectrum, of the intensity of the sunlight spectrum minus losses due to the sensor cover, and of the intensity of the sunlight spectrum minus the losses due to the sensor cover and to the sensitivity of the sensor unit, depending on a wavelength, and FIG. 8 a partial section of an alternative sun protection device according to the invention with a sensor unit, with a sensor cover and with a control and regulation unit, in a schematic sectional view.

DESCRIPTION OF THE EXEMPLARY EMBODIMENTS

FIGS. 1 and 2 show a sun protection device 10a. The sun protection device 10a is embodied by sunglasses. The sun protection device 10a is embodied by sunglasses which automatically darken depending on a solar irradiation. Principally, however, a different implementation of the sun protection device 10a, deemed expedient by someone having ordinary skill in the art, would be also conceivable. The sun protection device 10a comprises a spectacle frame 26a. The spectacle frame 26a is implemented by a spectacle framing. The spectacle frame 26a is substantially made of a plastics material. Principally, however, any other material would be conceivable which is deemed expedient by someone skilled in the art, e.g. wood, metal and/or a fiber-composite material. The spectacle frame 26a comprises a base frame 28a and two earpieces 29a, 29a', which are movably supported on the base frame 28a. The base frame 28a comprises a nose cut-out 30a to be supported on a nose of a user 31a. The ear pieces 29a, 29a' are respectively configured to be supported on the ears of the user 31a. The base frame 28a is composed of two frame parts 33a, 33a'. It would principally also be conceivable that the base frame 28a is embodied in a one-part implementation. The two frame parts 33a, 33a' are each embodied by a shell component. A first frame part 33a is arranged on a front side and a second frame part 33a' is arranged on a rear side. The frame parts 33a, 33a' are adhesively bonded with each other, wherein a hollow space between the frame parts 33a, 33a' is sealed off. Components which are arranged inside the base frame 28a are laid into the frame parts 33a, 33a' prior to adhesive bonding.

Furthermore the sun protection device 10a comprises an optical sun protection filter 12a. The spectacle frame 26a is configured to accommodate the optical sun protection filter 12a. The sun protection filter 12a is accommodated in the spectacle frame 26a. A light permeability of the optical sun protection filter 12a is embodied in such a way that it is adjustable. The optical sun protection filter 12a is embodied substantially transparent, wherein a Transmittance T of the optical sun protection filter 12a is implemented in such a way that it is electrically modifiable. The optical sun protection filter 12a comprises two liquid-crystal cells 14a, 14a'. The liquid-crystal cells 14a, 14a' are embodied that they are mirror-symmetrically with respect to each other. The liquid-crystal cells 14a, 14a' are accommodated in the spectacle frame 26a. The base frame 28a of the spectacle frame 26a comprises two recesses in which the liquid-crystal cells 14a, 14a' are accommodated. The liquid-crystal cells 14a, 14a' are respectively arranged on opposite sides of the nose cut-out 30a. Each of the liquid-crystal cells 14a, 14a' of the optical sun protection filter 12a is respectively allocated to an eye of the user 31a. The liquid-crystal cells 14a, 14a' each comprise a liquid-crystal plane which is switchable in the transmittance T. Principally, however, it would also be conceivable that the optical sun protection filter 12a comprises only one liquid-crystal cell 14a, which in particular extends over both eyes of the user 31a.

The liquid-crystal cells 14a, 14a' of the optical sun protection filter 12a are respectively implemented by a synthetic liquid-crystal cell. The liquid-crystal cells 14a, 14a' each consist of a plurality of layers. The liquid-crystal cells 14a, 14a' of the optical sun protection filter 12a are each embodied at least partly bent. The liquid-crystal cells 14a, 14a' of the optical sun protection filter 12a are each embodied in such a way that they are bent over an entire extension (FIG. 3).

The sun protection device 10a further comprises a sensor unit 16a. The sensor unit 16a is configured for capturing a solar irradiation. The sensor unit 16a comprises a sensor surface 20a, which is configured for directly capturing a solar irradiation. The sensor unit 16a is arranged in the spectacle frame 26a. The sensor unit 16a is arranged in the base frame 28a of the spectacle frame 26a between the recesses for the liquid-crystal cells 14a, 14a'. The sensor unit 16a is arranged in the base frame 28a of the spectacle frame 26a above the nose cut-out 30a. The sensor unit 16a is integrated in the spectacle frame 26a. The base frame 28a of the spectacle frame 26a comprises, above the nose cut-out 30a, an accommodating region 42a. The accommodating region 42a is embodied by a deepening. The sensor unit 16a is arranged in the accommodating region 42a of the base frame 28a. The sensor unit 16a comprises one photodiode or a plurality of photodiodes. The photodiodes form a photodiode region 27a. The sensor unit 16a is embodied by the photodiode region 27a. The photodiodes of the photodiode region 27a are respectively embodied by a photocell. Principally, however, it would also be conceivable that the sensor unit 16a comprises, for example, a solar cell. Beyond this it would also be conceivable, for example, that at least a portion of the sensor unit 16a, e.g. individual photodiodes, are arranged as a stripe in a forehead region of the sun protection device 10a.

Furthermore the sun protection device 10a comprises a control and regulation unit 44a. The control and regulation unit 44a is configured to control a permeability of the optical sun protection filter 12a depending on a solar irradiation. The control and regulation unit 44a is for this purpose connected to the sensor unit 16a (in a manner that is not visible in detail). Moreover the control and regulation unit 44a is connected to the liquid-crystal cells 14a, 14a' of the optical sun protection filter 12a (in a manner that is not visible in detail). In a manner that is not shown in detail, the control and regulation unit 44a is electrically connected to the electrode layers of the liquid-crystal cells 14a, 14a'. The control and regulation unit 44a is arranged in the spectacle frame 26a. The control and regulation unit 44a is arranged in the base frame 28a of the spectacle frame 26a between the recesses for the liquid-crystal cells 14a, 14a'. The control and regulation unit 44a is arranged in the base frame 28a of the spectacle frame 26a above the nose cut-out 30a. The control and regulation unit 44a is integrated in the spectacle frame 26a. The control and regulation unit 44a is arranged in the accommodating region 42a of the base frame 28a. Principally, however, a different arrangement of the control and regulation unit 44a, which is deemed expedient by someone skilled in the art, would also be conceivable. The control and regulation unit 44a is continuously in operation and is in particular not deactivatable. The control and regulation unit 44a switches on when a defined voltage applied to the sensor unit 16a is reached and starts oscillating. Principally, however, it would also be conceivable that the control and regulation unit 44a is set into operation via a switch (that is not shown in detail).

The sensor unit 16a is in an operating state configured to at least partly supply an energy for actuating the liquid-crystal cells 14a, 14a' of the optical sun protection filter 12a. The sensor unit 16a is configured to fully supply an energy for actuating the liquid-crystal cells 14a, 14a' of the optical sun protection filter 12a during operation of the sun protection device 10a. The sensor unit 16a is configured to completely obtain an energy required for actuating the at least one liquid-crystal cell 14a, 14a' of the optical sun protection filter 12a during operation of the sun protection device 10a. The sensor unit 16a supplies the actuation voltage $V_A$. Furthermore the sun protection device 10a is thus embodied in a battery-free fashion.

When the sun protection device 10a is operated, the liquid-crystal cells 14a, 14a' of the optical sun protection filter 12a are actuated for the purpose of adapting a permeability depending on a solar irradiation. Herein a solar irradiation is captured by means of the sensor unit 16a and the liquid-crystal cells 14a, 14a' are actuated in a manner depending thereon.

The sun protection device 10a also comprises a sensor cover 18a. The sensor cover 18a covers the sensor surface 20a of the sensor unit 16a at least partly. The sensor cover 18a covers the sensor surface 20a of the sensor unit 16a substantially completely. The sensor cover 18a covers the sensor surface 20a of the sensor unit 16a completely. The sensor cover 18a covers the accommodating region 42a of the base frame 28a of the spectacle frame 26a. The sensor cover 18a is implemented by a plate-shaped cover. The sensor cover 18a is made of a partly translucent and/or transparent material, which absorbs, respectively reflects or transmits a radiation depending on a wavelength of the radiation. The sensor cover 18a is, at least partly, at least substantially opaque with respect to a radiation of a visible light spectrum 22a. The sensor cover 18a is at least substantially opaque with respect to a large part of the radiation of the visible light spectrum 22a. The sensor cover 18a is opaque with respect to a radiation with a wavelength of 380 nm to 600 nm. In this wavelength range, an opaqueness of the sensor cover 18a is substantially equivalent to an opaqueness of the spectacle frame 26a, in particular of the base frame 28a of the spectacle frame 26a. Moreover the sensor cover 18a is, at least partly, at least substantially translucent with respect to a radiation of an infrared-light spectrum 24a. The sensor cover 18a is substantially translucent with respect to a large part of the radiation of the near-infrared-light spectrum, in particular of the entire infrared-light spectrum 24a. The sensor cover 18a is substantially translucent with respect to a radiation having a wavelength from 780 nm to 1100 nm. In this wavelength range, a transparency of the sensor cover 18a is greater than 30%, preferably greater than 80%. A transparency of the sensor cover 18a is in this wavelength range approximately 90%.

Alternatively or additionally the sensor cover 18a is, in particular at least partly, at least substantially translucent with respect to a radiation of a UV light spectrum. The sensor cover 18a is substantially translucent, in particular with respect to a large portion of the radiation of the UV-A light spectrum, preferably or the entire UV light spectrum. The sensor cover 18a is substantially translucent in particular with respect to a radiation with a wavelength of 100 nm to 400 nm. A transparency of the sensor cover 18a is in this wavelength range greater than 30%, preferably greater than 80%. A transparency of the sensor cover 18a is in this wavelength range approximately 90%. The sensor cover 18a may therefore be at least substantially translucent with respect to a radiation of an infrared-light spectrum and/or with respect to a radiation of a UV light spectrum.

The sensor cover 18a is furthermore partly embodied in a one-part implementation with the spectacle frame 26a. The sensor cover 18a is embodied in a one-part implementation with the base frame 28a of the spectacle frame 26a. The sensor cover 18a is made of the same material as the base frame 28a of the spectacle frame 26a. The sensor cover 18a has a smaller material thickness than the base frame 28a. Principally, however, a different implementation would also be conceivable. The sensor cover 18a and the spectacle frame 26a are produced partly in an injection-molding procedure. The sensor cover 18a and the base frame 28a of the spectacle frame 26a are produced together in a one-part implementation in an injection-molding procedure. Principally, however, it would also be conceivable that the sensor cover 18a and the base frame 28a of the spectacle frame 26a are made of different materials. Herein it would in particular be conceivable that the sensor cover 18a and the base frame 28a of the spectacle frame 26a are produced together in a one-part implementation in a multi-component injection molding procedure. Principally, however, it would also be conceivable that the sensor cover 18a and the base frame 28a are connected in a one-part implementation in any other way that is deemed expedient by someone skilled in the art, e.g. via an adhesive-bonding process.

In a method for producing the sun protection device 10a at least a portion of the spectacle frame 26a and the sensor cover 18a are produced in a one-part implementation in an injection-molding procedure. The sensor cover 18a and the base frame 28a of the spectacle frame 26a are produced in a one-part implementation in an injection-molding procedure, in particular in a one-component injection-molding procedure.

FIG. 6 shows a diagram of an intensity curve 46a of the sunlight spectrum over a wavelength. Herein the intensity is marked on a y-axis 48a. On the x-axis 50a the wavelength is marked in nm, wherein the diagram extends from 400 nm to 1100 nm. The diagram also shows a sensitivity curve 51a of the sensor unit 16a over the wavelength. Herein a sensitivity is marked on a y-axis 48a. The sensor unit 16a features a high degree of sensitivity in an infrared range, in particular in a near-infrared-light spectrum. A maximum value of the sensitivity of the sensor unit 16a is located within the near-infrared-light spectrum. Moreover the diagram shows a sensitivity curve 52a of the sensor unit 16a over the wavelength, depending on the intensity curve 46a of the sunlight spectrum. Herein the sensitivity is marked on a y-axis 48a. The diagram furthermore shows a transparency curve 54a of the sensor cover 18a over the wavelength. Herein the transparency is marked on a y-axis 48a in %, the diagram extending from 0% to 100%. The diagram also shows a sensitivity curve 56a of the sensor unit 16a, depending on the intensity curve 46a of the sunlight spectrum and depending on the transparency curve 54a of the sensor cover 18a over the wavelength. Herein the sensitivity is marked on a y-axis 48a. The sensitivity curve 56a of the sensor unit 16a, which depends on the intensity curve 46a of the sunlight spectrum and depends on the transparency curve 54a of the sensor cover 18a, allows deducting the amount of sunlight energy that is utilizable by the sensor unit 16a. Accordingly, approximately 25% of the sunlight energy are utilizable, as an electrical voltage and as an available current, for actuating the sun protection filter 12a.

FIG. 7 shows a diagram of the intensity curve 46a of the sunlight spectrum over the wavelength. The diagram furthermore shows an intensity curve 58a of the sunlight spectrum over the wavelength, minus the loss due to the sensor cover 18a. The diagram also shows an intensity curve 60a of the sunlight spectrum over the wavelength, minus the loss due to the sensor cover 18a and minus the loss due to the sensitivity of the sensor unit 16a. Herein the intensity is respectively marked on a y-axis 48'. The wavelength is marked in nm on the x-axis 50a', wherein the diagram extends from 400 nm to 1100 nm.

In FIG. 8 a further exemplary embodiment of the invention is shown. The following description is substantially limited to the differences between the exemplary embodiments, wherein the description of the exemplary embodiment of FIGS. 1 to 7 may be referred to in regard to structural components, features and functions that remain the same. For the purpose of distinguishing between the exemplary embodiments, the letter a in the reference numerals of the exemplary embodiment of FIGS. 1 to 7 was replaced by the letter b in the reference numerals of the exemplary embodiment of FIG. 8. Regarding structural components having the same designation, in particular regarding structural components with the same reference numerals, principally the drawings and/or the description of the exemplary embodiment of FIGS. 1 to 7 may be referred to.

FIG. 8 shows a partial section of a sun protection device 10b. The sun protection device 10b is embodied by sunglasses. The sun protection device 10b is embodied by sunglasses which darken automatically depending on a solar irradiation. The sun protection device 10b comprises a spectacle frame 26b. The spectacle frame 26b is substantially made of a plastics material. The spectacle frame 26b comprises a base frame 28b as well as two earpieces which are movably supported on the base frame 28b.

The sun protection device 10b further comprises an optical sun protection filter 12b. A light permeability of the optical sun protection filter 12b is implemented in such a way that it is adjustable. The optical sun protection filter 12b is implemented substantially transparent, wherein a transmittance T of the optical sun protection filter 12b is implemented in such a way that it is electrically modifiable. The optical sun protection filter 12b comprises two liquid-crystal cells 14b, only one of which is visible.

Furthermore the sun protection device 10b comprises a sensor unit 16b. The sensor unit 16b is configured for capturing a solar irradiation. The sun protection device 10b further comprises a control and regulation unit 44b. The control and regulation unit 44b is configured for controlling a permeability of the optical sun protection filter 12b depending on a solar irradiation.

The sun protection device 10b also comprises a sensor cover 18b. The sensor cover 18b covers the sensor surface 20b of the sensor unit 16b at least partly. The sensor cover 18b covers the sensor surface 20b of the sensor unit 16b substantially completely. The sensor cover 18b is made of a partly translucent and/or transparent material, which absorbs, respectively reflects or transmits, a radiation depending on a wavelength of the radiation. The sensor cover 18b is at least substantially opaque with respect to a large portion of the radiation of the visible light spectrum. The sensor cover 18b is opaque with respect to a radiation with a wavelength of 380 nm to 600 nm. Furthermore the sensor cover 18b is substantially translucent with respect to a large portion of the radiation of the near-infrared-light spectrum, in particular the entire infrared-light spectrum. The sensor cover 18b is substantially translucent with respect to a radiation with a wavelength of 780 nm to 1100 nm. A transparency of the sensor cover 18b is in this wavelength range greater than 70%, preferably greater than 80%. A transparency of the sensor cover 18b is in this wavelength range approximately 90%.

The sensor cover 18b is furthermore connected to the spectacle frame 26b. The sensor cover 18b is fixedly connected to the spectacle frame 26b. The sensor cover 18b is connected to the spectacle frame 26b at least fixed in position. The sensor cover 18b is moreover at least partly inserted in the base frame 28b of the spectacle frame 26b. The sensor cover 18b is inserted in the base frame 28b of the spectacle frame 26b in a form-fit implementation, a force-fit implementation and/or via substance-to-substance bond. The sensor cover 18b is inserted in the base frame 28b of the spectacle frame 26b at least in a form-fit implementation. Principally, however, it would also be conceivable that the sensor cover 18b has, for example, merely been placed on the base frame 28b, thus covering the accommodating region 42b of the base frame 28b. It would herein also be conceivable, in particular, that the sensor cover 18b is mounted on the base frame 28b only subsequently. The sensor cover 18b is made of a material that differs from the material of the base frame 28b of the spectacle frame 26b. The sensor cover 18b is herein implemented by a separate, platelet-shaped cover. The sensor cover 18b is latched in the base frame 28b of the spectacle frame 26b. Principally, however, a different connection between the sensor cover 18b and the base frame 28b of the spectacle frame 26b, which is deemed expedient by someone skilled in the art, would also be conceivable.

The invention claimed is:

1. Sunglasses with at least one optical sun protection filter comprising at least one liquid-crystal cell and with at least one sensor unit, which is configured for capturing solar radiation, wherein at least one sensor cover, which covers a sensor surface of the at least one sensor unit and which is opaque with respect to radiation of at least 70% of a spectral range of the visible light spectrum, so that a total of at least 70% of respective radiation is blocked either by absorption, by reflection or by a combination of both, and the sensor cover and a spectacle frame are one-component injection-molded, so that the at least one sensor cover is embodied at least with a base frame of the spectacle frame as one part, wherein the sensor cover and the base frame are made of the same material.

2. The sunglasses according to claim 1, wherein the at least one sensor cover covers the sensor surface of the at least one sensor unit entirely.

3. The sunglasses according to claim 1, wherein the at least one sensor cover is at least translucent with respect to a radiation of at least 70% of a spectral range from 780 nm up to 1100 nm of an infrared-light spectrum, so that wherein at least 70% of a respective radiation is transmitted.

4. The sunglasses according to claim 1, wherein the at least one sensor cover is at least translucent with respect to a radiation of at least 70% of a spectral range from 100 nm to 380 nm of the UV light spectrum, wherein at least 70% of a respective radiation is transmitted.

5. The sunglasses according to claim 1, further comprising the spectacle frame, which is configured for accommodating the optical sun protection filter.

6. The sunglasses according to claim 1, wherein the at least one sensor unit is in at least one operating state configured to at least partly supply an energy for actuating the at least one liquid-crystal cell of the optical sun protection filter.

7. The sunglasses according to claim 1, wherein the at least one sensor unit comprises at least one photodiode and/or at least one solar cell.

8. A method for producing sunglasses according to claim 1, wherein at least a portion of the spectacle frame and the at least one sensor cover are produced as the one part in an injection-molding procedure.

9. Sunglasses with at least one optical sun protection filter comprising at least one liquid-crystal cell and with at least one sensor unit, which is configured for capturing solar radiation, wherein at least one sensor cover, which covers a sensor surface of the at least one sensor unit and which is opaque with respect to a radiation of at least 70% of a spectral range of the visible light spectrum, so that a total of at least 70% of respective radiation is blocked, wherein the total blocked part of the respective radiation is a sum of radiation that is absorbed and radiation that is reflected, and the sensor cover and a spectacle frame are one-component injection-molded, so that the at least one sensor cover is embodied at least with a base frame of the spectacle frame as one part, wherein the sensor cover and the base frame are made of the same material.

* * * * *